United States Patent
Lu et al.

(10) Patent No.: US 10,661,159 B2
(45) Date of Patent: May 26, 2020

(54) MOBILE GAME CONTROL SYSTEM

(71) Applicant: SANE Products, Inc., Pasadena, CA (US)

(72) Inventors: Pei Hsun Lu, New Taipei (TW); Qian Yi Wang, Dongguan (CN); Li Xu, Dongguan (CN); Zi Yan Yuan, Dongguan (CN)

(73) Assignee: SANE Products, Inc., Pasadena, CA (US)

( * ) Notice: Subject to any disclaimer, the term of this patent is extended or adjusted under 35 U.S.C. 154(b) by 0 days.

(21) Appl. No.: 16/203,047

(22) Filed: Nov. 28, 2018

(65) Prior Publication Data
US 2020/0078669 A1 Mar. 12, 2020

Related U.S. Application Data (60) Provisional application No. 62/729,534, filed on Sep. 11, 2018.

(51) Int. Cl.
| | |
|---|---|
| *G06F 3/0488* | (2013.01) |
| *G06F 1/16* | (2006.01) |
| *A63F 13/23* | (2014.01) |
| *G06F 3/0354* | (2013.01) |

(52) U.S. Cl.
CPC .......... *A63F 13/23* (2014.09); *G06F 1/1607* (2013.01); *G06F 3/03547* (2013.01); *G06F 3/0488* (2013.01)

(58) Field of Classification Search
CPC ... G06F 1/1607; G06F 3/03547; G06F 3/0488
See application file for complete search history.

(56) References Cited

U.S. PATENT DOCUMENTS

| | | | | |
|---|---|---|---|---|
| 7,277,081 | B2 * | 10/2007 | Ukita | G06F 1/1616 345/156 |
| 7,403,191 | B2 * | 7/2008 | Sinclair | G06F 3/0224 345/168 |
| 7,432,911 | B2 * | 10/2008 | Skarine | G06F 1/1626 200/314 |
| 7,479,943 | B1 * | 1/2009 | Lunsford | G06F 3/0224 345/157 |
| 7,659,885 | B2 * | 2/2010 | Kraus | B41J 5/102 345/168 |

(Continued)

FOREIGN PATENT DOCUMENTS

| | | | | |
|---|---|---|---|---|
| TW | M532090 U | * | 6/2016 | H01H 13/702 |

*Primary Examiner* — Steven J Hylinski
(74) *Attorney, Agent, or Firm* — Dariush G. Adli; Adli Law Group P.C.

(57) ABSTRACT

The present disclosure relates to a mobile game control system that efficiently implements additional button(s) to mobile devices for playing mobile games or using mobile applications. In one embodiment, the disclosed mobile game control system comprises a screen cover attachable to the touchscreen of a mobile device. The screen cover has at least one conductive route partially or fully embedded within the screen cover and is configured to receive a static electrical signal generated from a human finger at a first end and deliver it to a second end. When the static electrical signal is delivered to the second end, a simulated touch is produced at the second end as if the touchscreen is being physically touched at the second end location.

7 Claims, 12 Drawing Sheets

(56) References Cited

U.S. PATENT DOCUMENTS

| | | | | |
|---|---|---|---|---|
| 8,279,183 B2* | 10/2012 | Ladouceur | G06F 3/041 | 345/173 |
| 8,421,761 B2* | 4/2013 | Natanzon | G06F 3/04842 | 345/156 |
| 9,041,665 B2* | 5/2015 | Skinner | G06F 3/03547 | 345/173 |
| 9,170,658 B2* | 10/2015 | Quek | G06F 3/033 | |
| 9,261,965 B2* | 2/2016 | King | G06F 3/016 | |
| 9,405,457 B2* | 8/2016 | Huang | G06F 3/0488 | |
| 10,318,025 B2* | 6/2019 | Lee | G06F 3/038 | |
| 10,437,411 B2* | 10/2019 | Helmes | G06F 1/1632 | |
| 2006/0125785 A1* | 6/2006 | McAlindon | G06F 3/0235 | 345/156 |
| 2006/0256090 A1* | 11/2006 | Huppi | A63F 13/02 | 345/173 |
| 2008/0238879 A1* | 10/2008 | Jaeger | G06F 3/03545 | 345/173 |
| 2009/0079705 A1* | 3/2009 | Sizelove | B64D 11/0015 | 345/173 |
| 2010/0079403 A1* | 4/2010 | Lynch | G06F 3/0202 | 345/174 |
| 2010/0097327 A1* | 4/2010 | Wadsworth | G06F 3/04886 | 345/173 |
| 2010/0302168 A1* | 12/2010 | Giancarlo | G06F 1/1662 | 345/169 |
| 2010/0315348 A1* | 12/2010 | Jellicoe | G06F 3/041 | 345/173 |
| 2011/0157056 A1* | 6/2011 | Karpfinger | G06F 3/0202 | 345/173 |
| 2011/0199325 A1* | 8/2011 | Payne | G06F 3/0338 | 345/173 |
| 2011/0227841 A1* | 9/2011 | Argiro | G06F 3/016 | 345/173 |
| 2011/0227872 A1* | 9/2011 | Huska | G06F 3/016 | 345/174 |
| 2011/0248947 A1* | 10/2011 | Krahenbuhl | G06F 1/1643 | 345/174 |
| 2012/0169597 A1* | 7/2012 | Liotta | G06F 3/0338 | 345/161 |
| 2013/0120258 A1* | 5/2013 | Maus | G06F 3/044 | 345/161 |
| 2013/0215029 A1* | 8/2013 | Comer, Jr. | G06F 3/016 | 345/161 |
| 2014/0247246 A1* | 9/2014 | Maus | G06F 1/1632 | 345/174 |
| 2014/0253445 A1* | 9/2014 | Petersen | G06F 3/033 | 345/161 |
| 2016/0048261 A1* | 2/2016 | Argiro | G06F 3/016 | 345/174 |

* cited by examiner

MOBILE GAME CONTROL SYSTEM

CROSS-REFERENCE TO RELATED PATENT APPLICATIONS

Embodiments of the present invention relate to U.S. Provisional Application Ser. No. 62/729,534, filed Sep. 11, 2018, entitled "MOBILE GAME CONTROL SYSTEM", the contents of which are incorporated by reference herein in its entirety and which is a basis for a claim of priority.

FIELD OF THE INVENTION

Embodiments of the present disclosure generally relate to a mobile game control system, and more specifically to a screen cover for mobile devices that can generate simulated touches on touchscreens of mobile devices and provide additional control button(s) for mobile games and applications.

BACKGROUND OF THE INVENTION

Since the release of mobile devices with touchscreens (e.g., iPhone and Android phone) years ago, especially the multi-touchscreen in 2007, the market for mobile games has grown substantially and is expected to continue. According to Newzoo®, a prominent global provider of games and esports analytics, mobile games in 2017 generated approximately $116 billion dollars in revenue worldwide and captured 41% of the global gaming market. They also predict mobile gaming will continue to grow and will capture more than fifty percent of the global gaming market in 2018, which surpasses revenues from conventional video game consoles and PC games combined.

Figure 11:
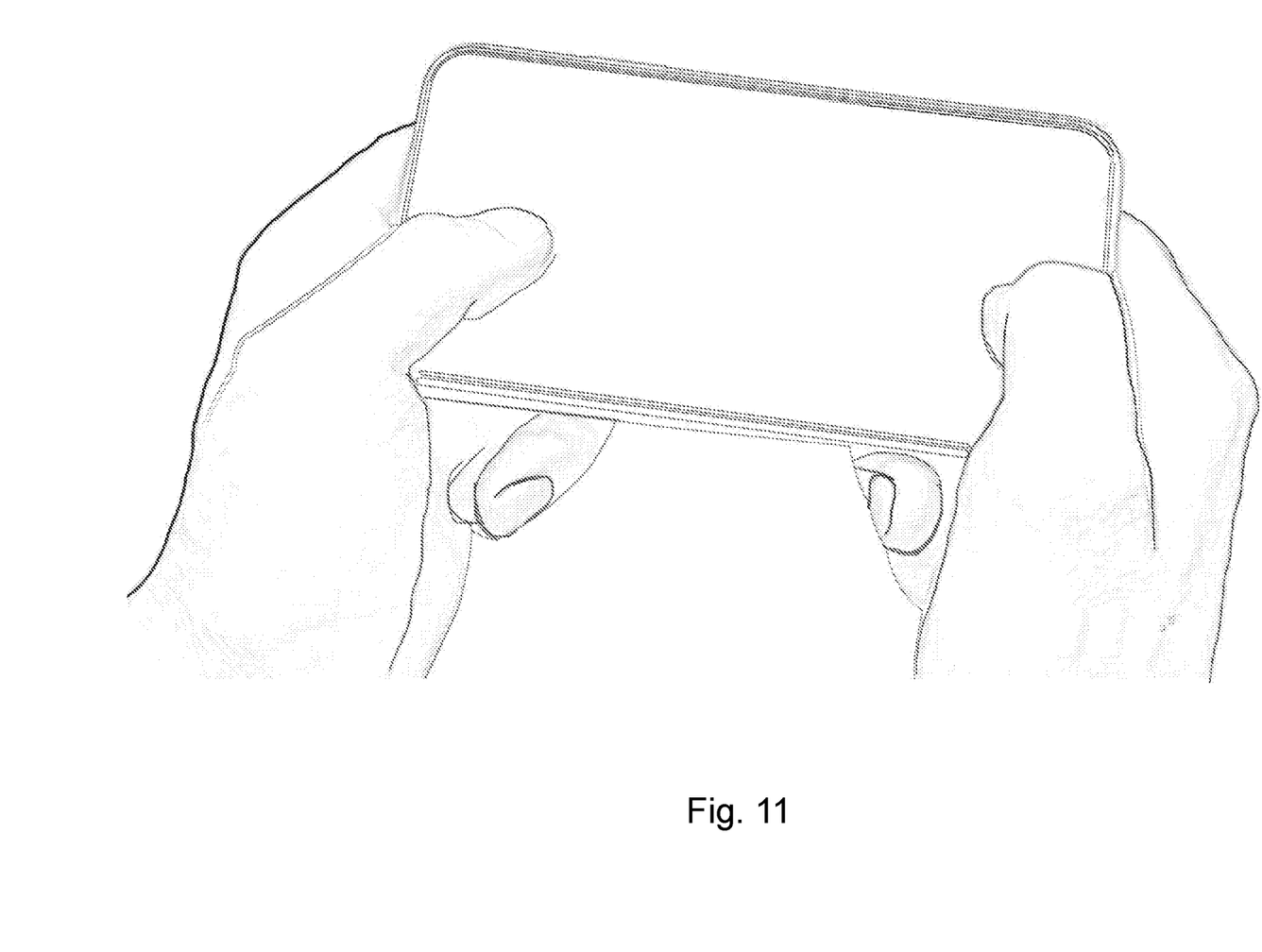
FIG. 11 is a schematic diagram according to an exemplary embodiment of the present disclosure.

While current mobile device technology provides a variety of ways to play games through touchscreen and inertial sensors, most mobile games are designed to be controlled by at most two fingers (e.g., typically thumbs of left and right hands as shown by FIG. 11). Unlike controllers for conventional game consoles or computer keyboard and mouse where there are different buttons designed for different fingers, virtually all mobile devices do not have additional button(s) designed for gaming. Thus, all controls for mobile games need to be inputted through the touchscreen, which can be difficult and not ergonomic if they require simultaneously use of multiple fingers on both hands. Such restriction severely limits the gaming development because designers are unable to implement more complex controls for their games and applications. While there are game controllers designed for mobile devices which look and function like controllers for conventional game consoles and which can be connected to mobile devices wirelessly, they are often bulky and inconvenient to carry around. Further, these controllers usually require electrical power to operate and may not be available to everyone due to the price and/or practicability, thereby making them not a viable solution to the aforementioned problems.

Accordingly, there exists a need for an improved mobile game control system that can effectively provide additional control button(s) to mobile devices and be used by mobile games and applications. There also exists a need for an improved mobile game control system that is simple and not costly to implement and space-efficient.

SUMMARY OF THE DISCLOSURE

The major objective of the present disclosure is to provide a mobile game control system which provides additional control button(s) for mobile devices where the additional control button(s) can be used for mobile games and applications.

Another objective of the present disclosure is to provide a mobile game control system that is simple to implement and easy to manufacture.

In accordance with one aspect of at least one embodiment of the present disclosure, the disclosed mobile game control system comprises: 1) a screen protector comprising a protecting layer and an adhesive layer, wherein the screen protector is configured to be attachable to a touchscreen of a mobile device through the adhesive layer; and 2) a first conductive route and a second conductive route partially or fully embedded within the screen protector, wherein the first conductive route is configured to receive a first static electrical signal or electrical signal at a first end of the first conductive route and deliver the first static electrical signal or the electrical signal to a second end of the first conductive route, and the second conductive route is configured to receive a second static electrical signal or electrical signal at a first end of the second conductive route and deliver the second static electrical signal or electrical signal to a second end of the second conductive route.

The second end of the first conductive route is configured to locate at an area that corresponds to a first specified point on the touchscreen of the mobile device when the screen protector is attached to the touchscreen and the second end of the second conductive route is configured to locate at an area that corresponds to a second specified point on the touchscreen that is different from the first specified point. When the first static electrical signal or electrical signal is delivered to the second end of the first conductive route, a simulated touch is produced through the first static electrical signal or electrical sign a at the first specified point of the touchscreen as if the first specified point of the touchscreen is being physically touched. Similarly, when the second static electrical signal or electrical signal is delivered to the second end of the second conductive route, a simulated touch is produced through the second static electrical signal or electrical signal at the second specified point of the touchscreen as if the second specified point of the touchscreen is being physically touched.

The mobile game control system may further comprise a casing adapted to fit the mobile device, wherein the casing comprises a first button that connects to the first end of the first conductive route and a second button that connects to the first end of the second conductive route, where the first button provides the first static electrical signal or electrical signal to the first end of the first conductive route when the first button is pressed and the second button provides the second static electrical signal or electrical signal to the first end of the second conductive route when the second button is pressed.

The foregoing and other objects, features and advantages of the present invention are more readily apparent from the detailed description of the preferred embodiments set forth below, taken in conjunction with the accompanying drawings.

BRIEF DESCRIPTION OF THE DRAWINGS

FIG. 5 is a schematic diagram according to an exemplary embodiment of the present disclosure.

DETAILED DESCRIPTION OF PREFERRED EMBODIMENTS

The following description is not to be taken in a limiting sense, but is made merely for the purpose of illustrating the general principles of the invention, since the scope of the invention is best defined by the following claims. Various inventive features are described below that can each be used independently of one another or in combination with other features.

For purpose of the present disclosure, the term "mobile device" or "mobile devices" generally refer to mobile phone(s) and tablet(s) with touchscreen(s). The term "mobile game" and "mobile games" are not limited to games playable on mobile devices, but also include other non-gaming software and applications that can run on mobile devices. The term "screen cover" generally refers to any film, coating or material that can be applied or attached to the surface of a mobile device's screen. The screen cover includes, but is not limited to, screen protector, anti-glare filter/film, anti-fingerprint film or a combination thereof. The term "screen protector" generally refers to sheet(s) of material—commonly glass, tempered glass, PET film (polyethylene terephthalate) or TPU (thermoplastic polyreuthane)—that is designed to protect the screen of an electronic device against physical damage. Further, since it is not necessary for the disclosed screen cover and screen protector to fully cover touchscreens of the mobile devices for the present disclosure to work, the term screen cover and screen protector also include partial screen cover and partial screen protector (i.e., screen cover or protector which only covers part of the touchscreen). The term "static electrical signal" generally refers to signal generated from static electricity such as from human fingers, whereas the term "electrical signal" generally refers to signal generated from electric power such as battery.

Figure 1:
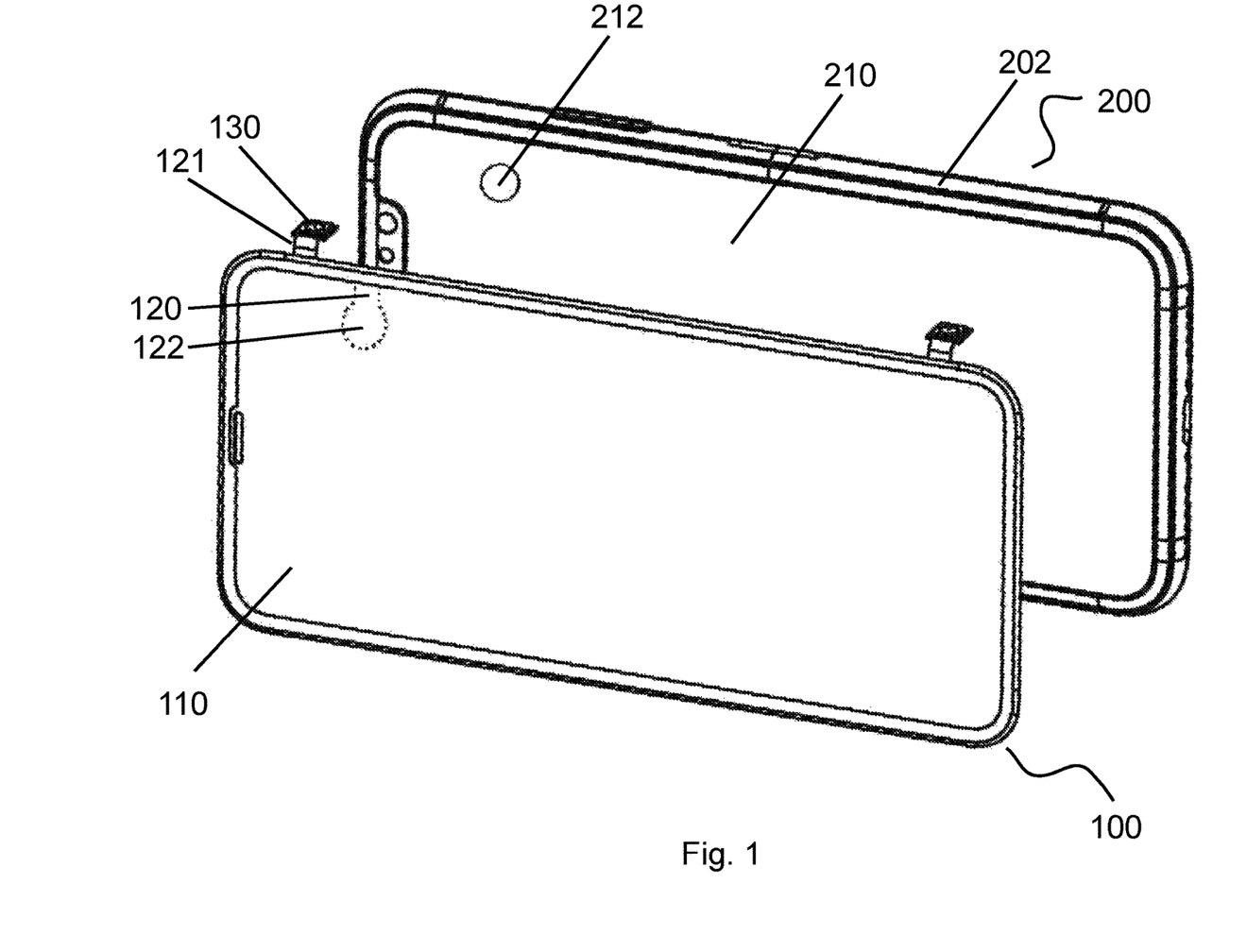
FIG. 1 is a schematic diagram according to an exemplary embodiment of the present disclosure.
Figure 2:
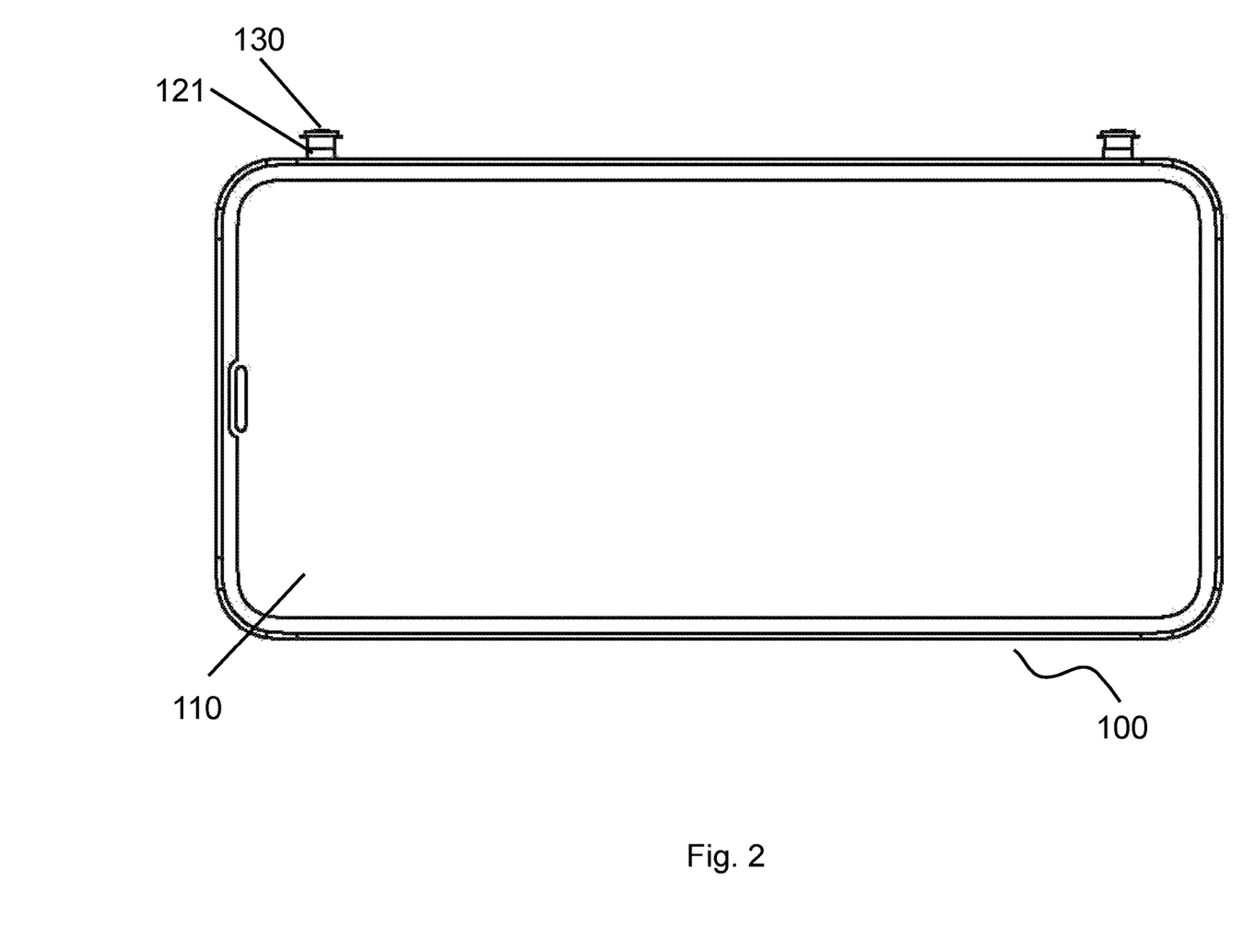
FIG. 2 is a schematic diagram according to an exemplary embodiment of the present disclosure.

Broadly, embodiments of the present disclosure generally provide a mobile game control system that effectively provides additional control button(s) to a mobile device so more complex control can be implemented into mobile games and applications. In one embodiment, as shown by FIGS. 1 to 4, the disclosed mobile game control system 100 comprises: a screen cover 110 configured to be attachable to a touchscreen 210 (e.g., capacitive touchscreen) of a mobile device 200; and at least one conductive route 120 partially or fully embedded within the screen cover 110, wherein the at least one conductive route 120 is configured to receive a static electrical signal or electrical signal (e.g., typically a static electrical signal generated from a human finger or an electrical signal generated from an electrical power source) at a first end 121 and deliver the static electrical signal or electrical signal to a second end 122. As shown by FIG. 1, the second end 122 of the at least one conductive route 120 is configured to locate at an area that corresponds to a specified point 212 on the touchscreen 210 of the mobile device 200 when the screen cover 110 is attached to the touchscreen 210. When the static electrical signal or electrical signal is delivered to the second end 122 of the at least one conductive route 120, a simulated touch is produced through the static electrical signal or electrical signal at the specified point 212 of the touchscreen 210 as if the specified point 212 of the touchscreen 210 is being physically touched (e.g., by a finger or stylus). This allows mobile game or application designers to design an input command at the specified point 212 and the input command will be triggered whenever a static electrical signal or electrical signal is received at the first end 121 and delivered to the second end 122.

Figure 10:
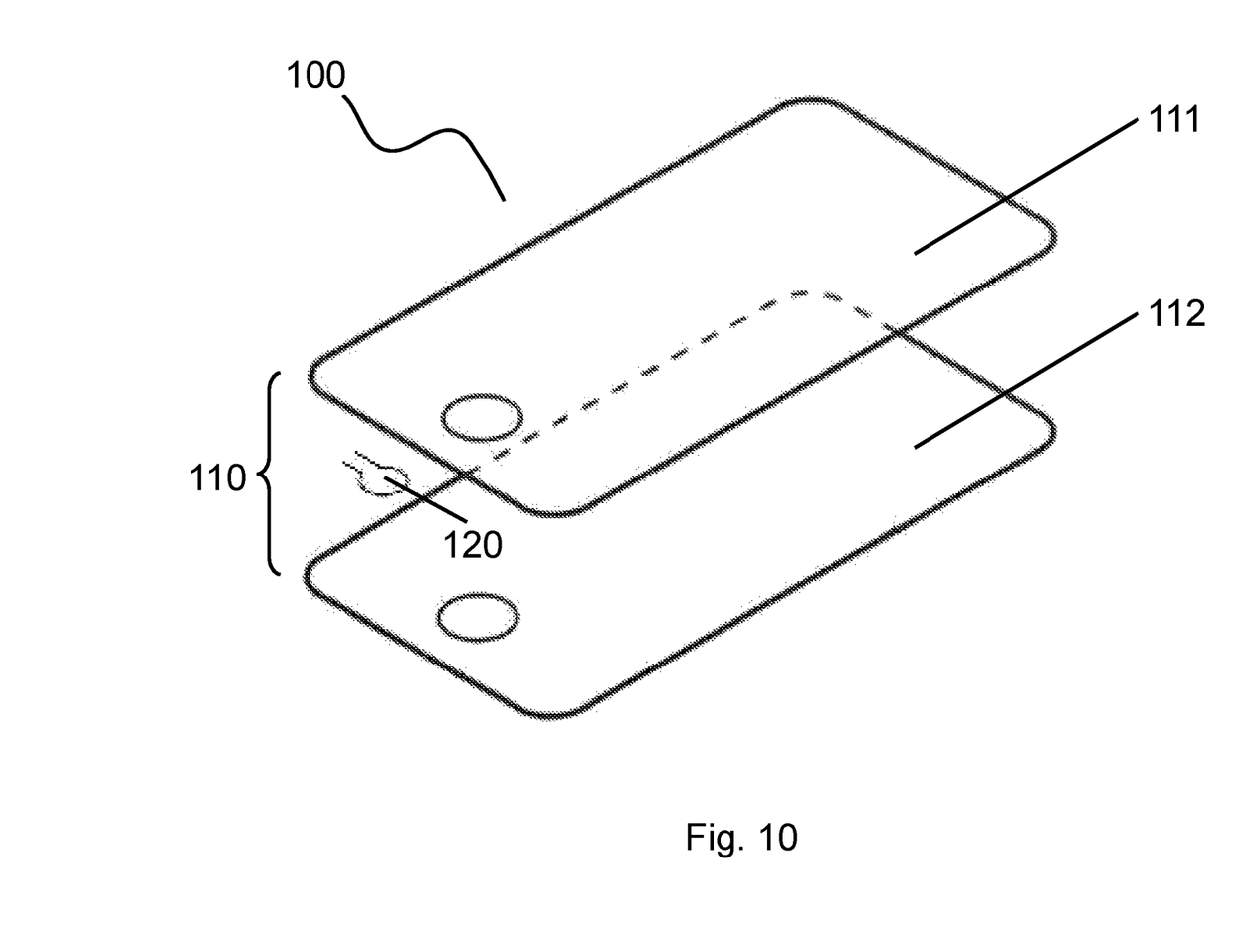
FIG. 10 is a schematic diagram according to an exemplary embodiment of the present disclosure.

In one embodiment of the present disclosure, as shown by FIG. 10, the screen cover 110 may comprise a screen protector layer 111 and an adhesive layer 112. The screen protector layer 111 can be made of glass, tempered glass, PET film (polyethylene terephthalate), TPU (thermoplastic polyreuthane) or a combination thereof. The adhesive layer 112 can be designed to be a zero residue adhesive layer which enables the screen cover 110 to be attached to the touchscreen 210 of the mobile device 200 through the adhesive layer 112. The screen cover 110 may optionally comprises an easy to clean anti-fingerprint layer, scratch resistant layer, impact dispersion layer, impact damping layer, high strength or a combination thereof.

Figure 3:
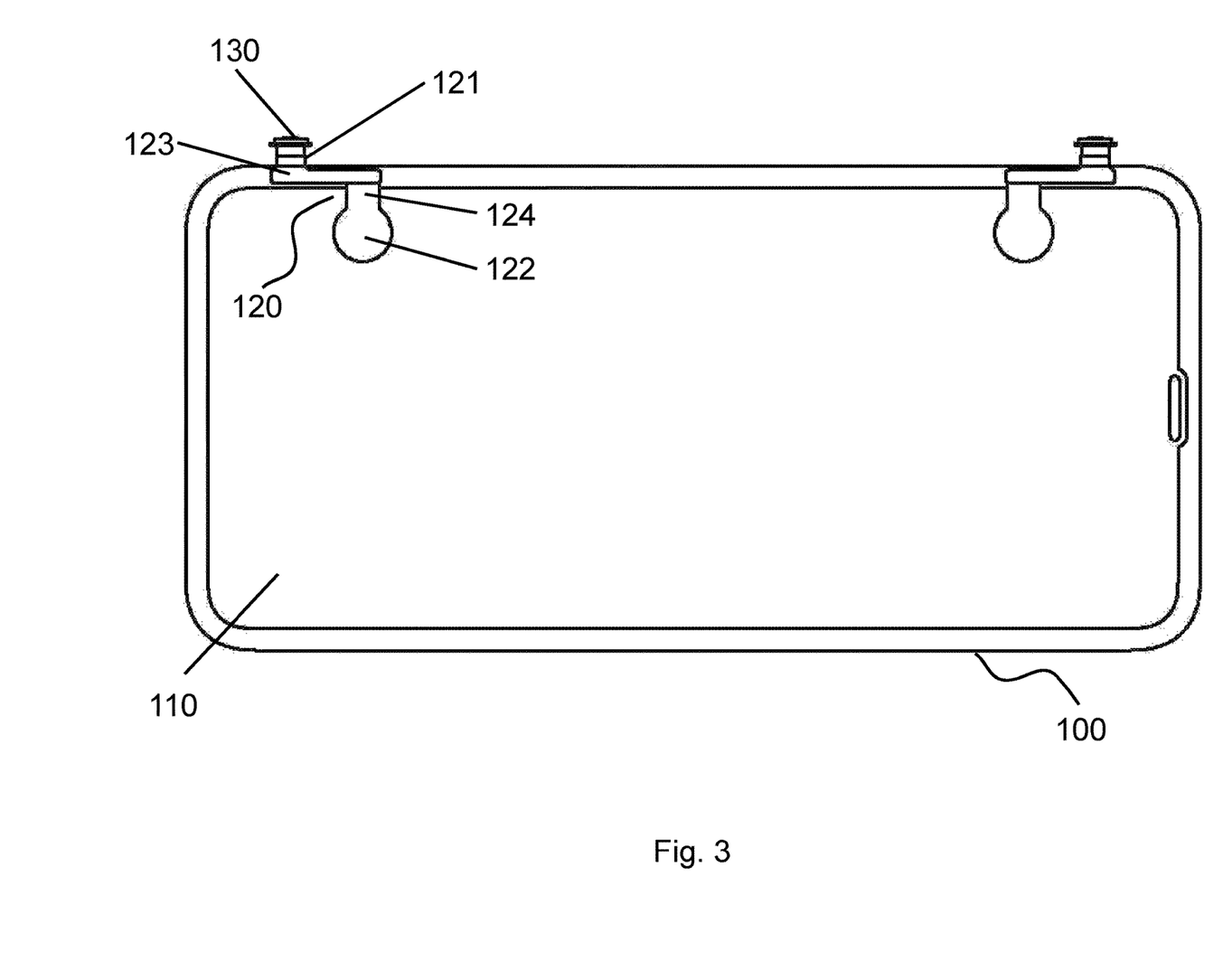
FIG. 3 is a schematic diagram according to an exemplary embodiment of the present disclosure.
Figure 4:
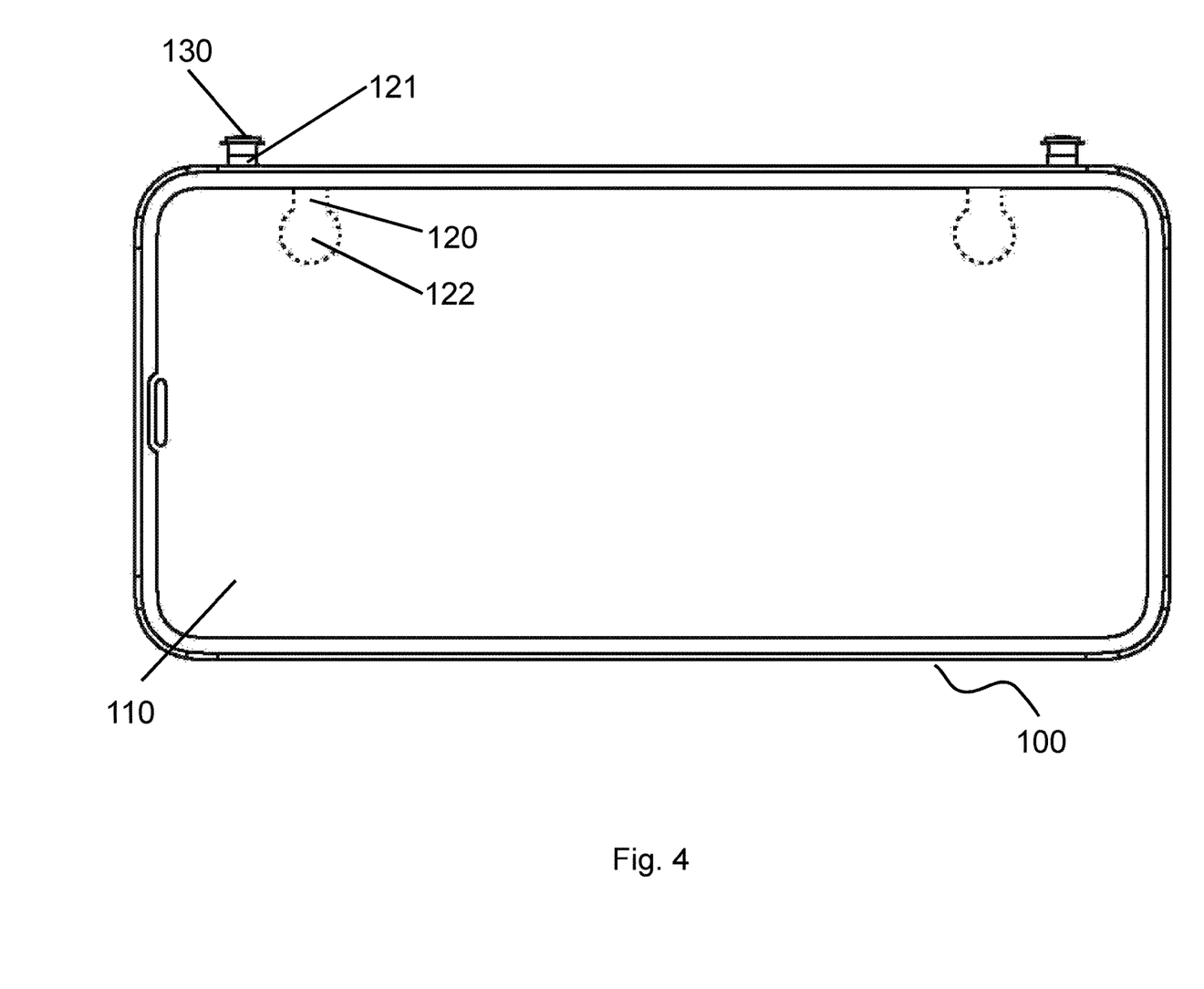
FIG. 4 is a schematic diagram according to an exemplary embodiment of the present disclosure.
Figure 6:
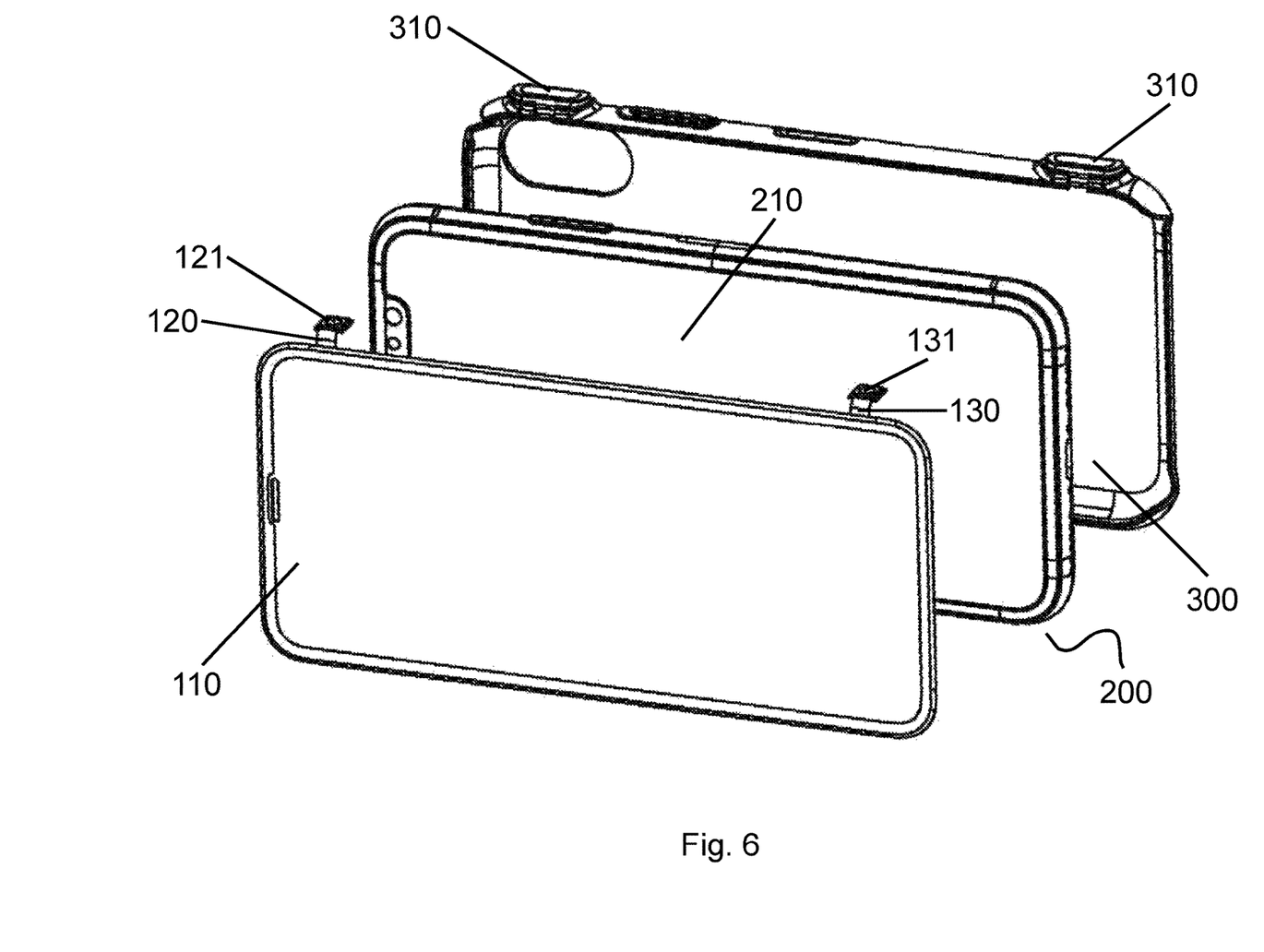
FIG. 6 is a schematic diagram according to an exemplary embodiment of the present disclosure.
Figure 7:
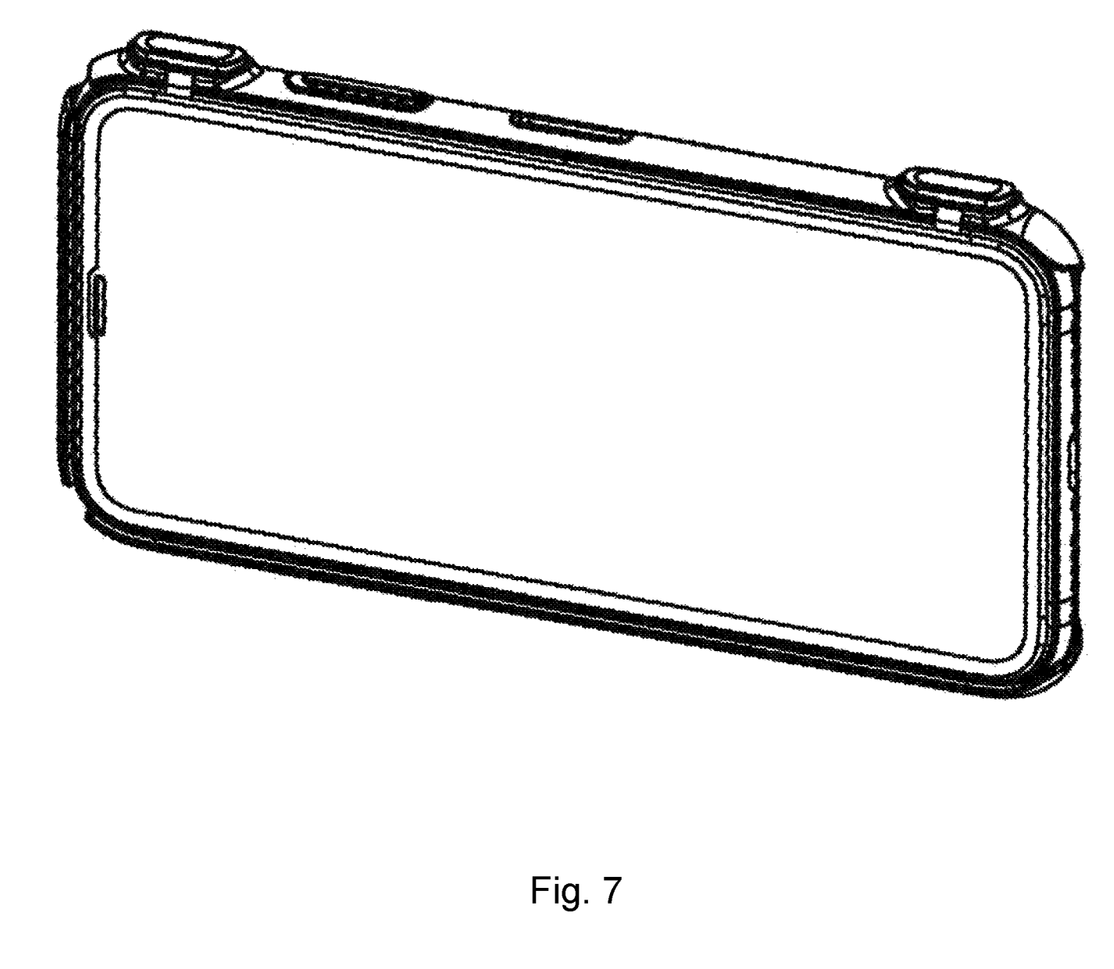
FIG. 7 is a schematic diagram according to an exemplary embodiment of the present disclosure.

As shown by FIGS. 1, 3 and 10, at least part of the at least one conductive route 120 is embedded within the screen cover 110, preferably, but not necessary, between the screen protector layer 111 and the adhesive layer 112. At least part of the at least one conductive route 120 comprises at least one conductive element such as metal, magnetic, FPC (Flexible Printed Circuit) softboard, flat cable, conductive ink, conductive plasma or a combination thereof.

In yet another embodiment of the present disclosure, as shown by FIG. 1, the first end 121 of the at least one conductive route 120 is configured to extend beyond the edge of the screen cover and is configured to rest on the side edge 202 of the mobile device 200. For example, while not necessary, the first end 121 can be designed to attach to the side edge 202 through adhesives, clips, magnetics or any other means of attachment available. When the first end 121 of the at least one conductive route 120 rests on the side edge 202, it can be used as a gaming control button. For example, when the first end 121 is being touched by a finger, the static electrical signal generated by the finger will pass from the first end 121 of the at least one conductive route 120 to the second end 122 and then to the specified point 212 of the touchscreen 210, causing a simulated touch to be produced at the specified point 212 of the touchscreen 210 as if the specified point 212 of the touchscreen 210 is being physically touched (e.g., by a finger or stylus). Thus, if a mobile game or application is designed to trigger a certain function or action whenever the specified point 212 of the touchscreen 210 is touched, the triggering can be done by touching the first end 121 instead of physically touching the specified point 212. The present disclosure allows multiple buttons to be easily added to mobile devices, thereby allowing the mobile game or application designers to implement more complex controls for their games and applications just like conventional game controllers.

Figure 12:
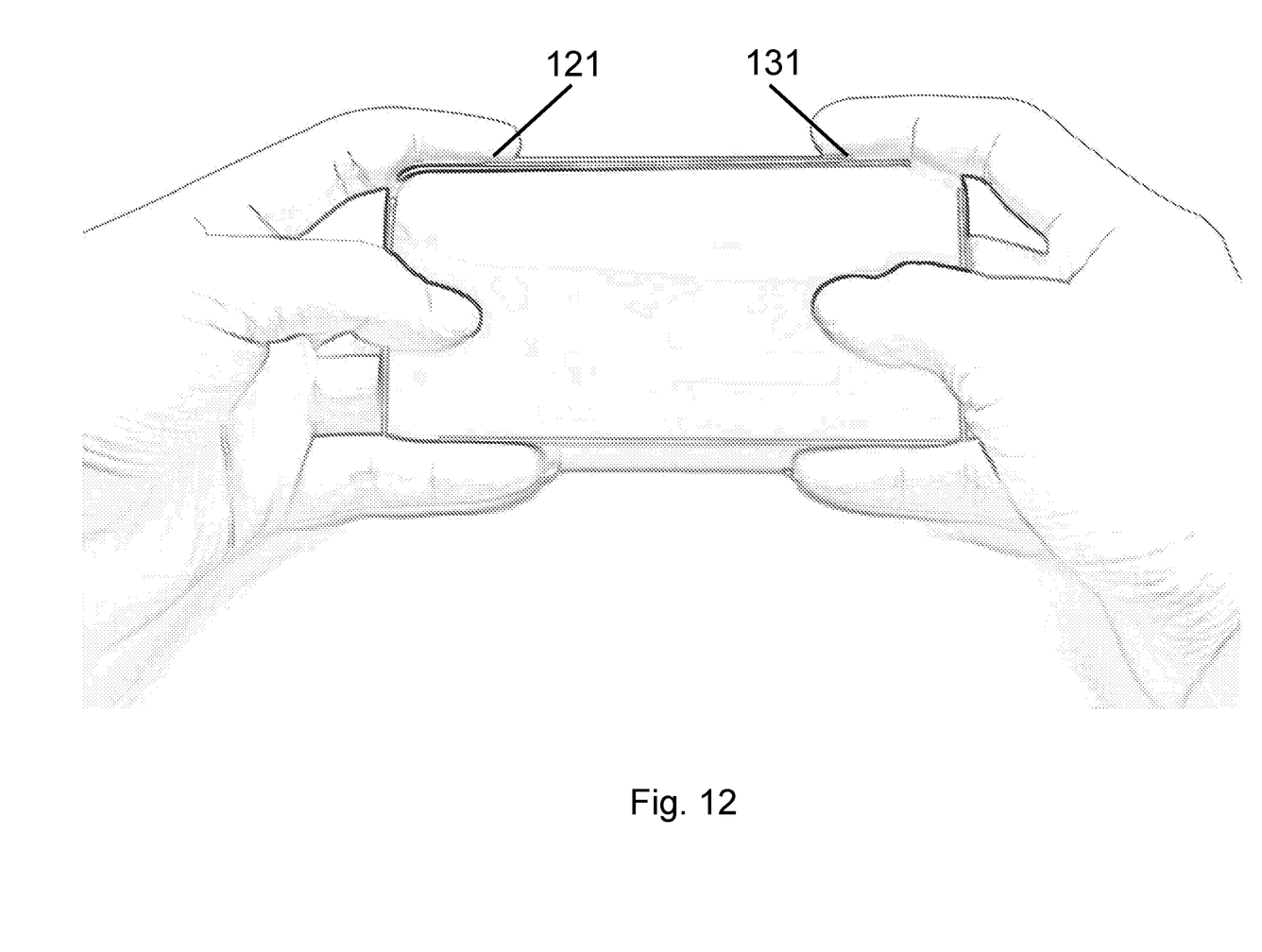
FIG. 12 is a schematic diagram according to an exemplary embodiment of the present disclosure.

Preferably, the first end 121 of the at least one conductive route 120 is designed to be controlled by an index finger of a user when the mobile device 200 is being held horizontally as illustrated by FIG. 12. Thus, the first end 121 should locate in proximity to the edge of the screen cover 110 or extend beyond the edge of the screen cover 110 whereas the second point 122 should locate somewhere within the screen cover 110 at a point that corresponds to a specified point on the touchscreen 210 of the mobile device 200. Note that the conductive route 120 is not required to be a single uninterrupted route from first end 121 to second end 122, it can be a combination or connection of multiple conductive routes. For example, as shown by FIG. 3, there may be a first conductive route 123 between first end 121 and the edge of the screen cover 110 and a second conductive route 124 between the edge of the screen cover 110 and the second end 122, where the first conductive route 123 is configured to connect to the second conductive route 124 at the edge of screen cover 110 to form the conductive route 120.

Figure 9:
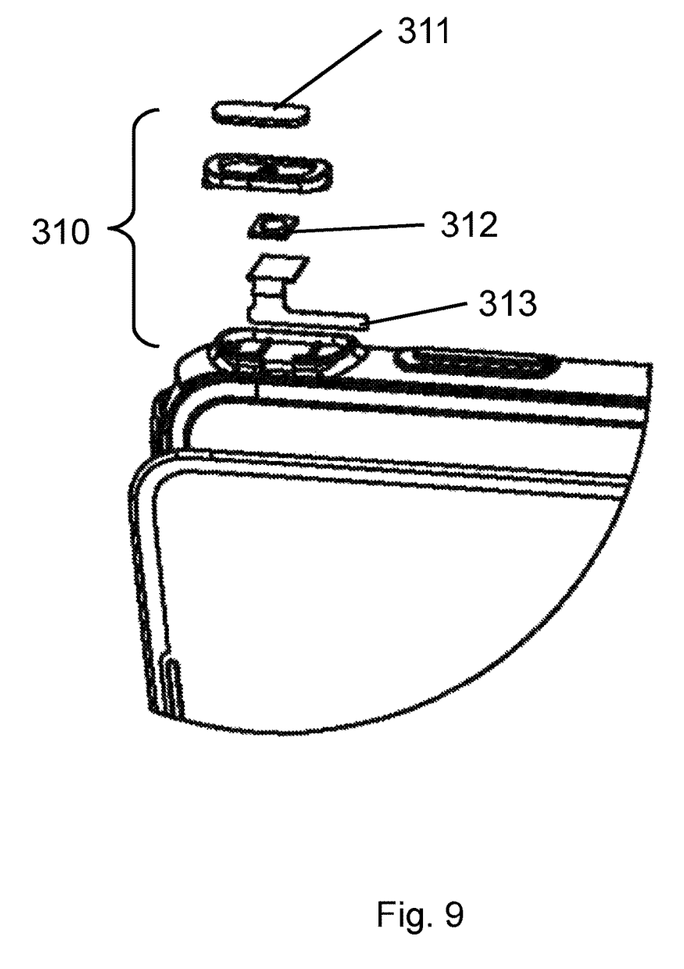
FIG. 9 is a schematic diagram according to an exemplary embodiment of the present disclosure.

In order to enhance the control experience and to make the control buttons of the present disclosure to feel more like buttons from conventional game controllers when pressed, the first end 121 of the at least one conductive route 120 can further be connected to a physical button 130 (e.g., preferably a button with a clicking mechanism as shown by FIG. 9). The physical button 130 can also be designed to rest on the side edge 202 of the mobile device 200 as well as shown by FIGS. 1 to 4 for ease of controlling.

Figure 8:
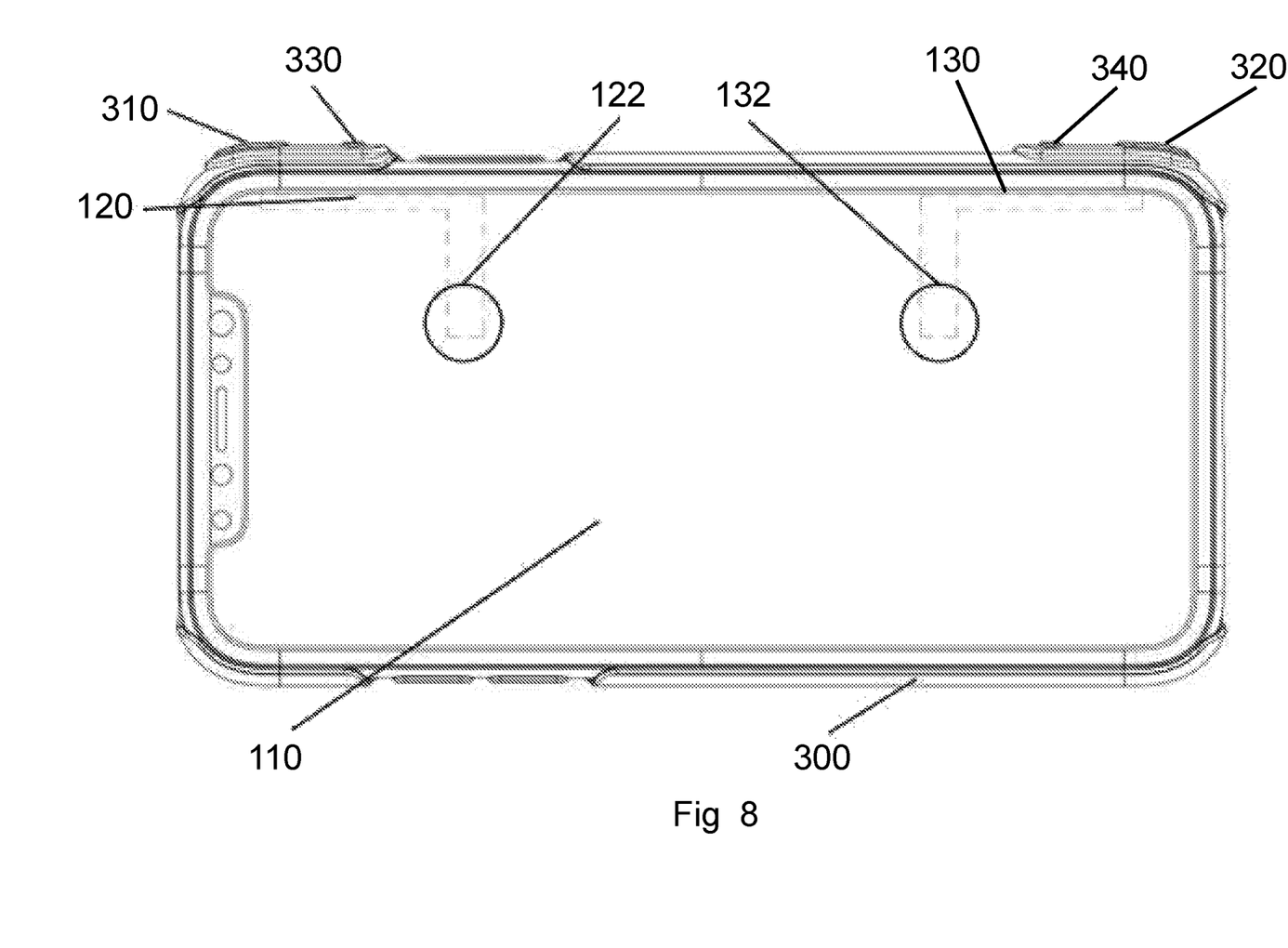
FIG. 8 is a schematic diagram according to an exemplary embodiment of the present disclosure.

In yet another embodiment of the present disclosure, as shown by FIGS. 5 to 8, the mobile game control system 100 may further comprise a casing 300 adapted to fit the mobile device 200. The casing 300 comprises at least one button (310, 320) where each button (310, 320) corresponds and connects to the first end (121, 131) of a conductive route (120, 130) and the button (310, 320) is configured to provide or pass the static electrical signal or electrical signal to the first end (121, 131) of its corresponding conductive route (120, 130) when pressed as shown by FIG. 8. The static electrical signal or electrical signal then travels to the second end (122, 132) to produce simulated touch at point(s) specified on the touchscreen 210 of the mobile device 200, namely point(s) that is adjacent to the second end (122, 132) on the touchscreen 210.

Preferably, as shown by FIG. 9, the button 310 has a clicking mechanism and comprise a metallic button surface 311 and a metal spring 312. When the button 310 is pressed, a static electrical signal generated from a finger (or an electrical signal generated from a power source linked to the button 310 depending on the design) is delivered to the first end 121 of the conductive route 120 through the metallic button surface 311 and the metal spring 312. A connection FPC 313 may optionally be utilized to connect the metal spring 312 to the first end 121 of the conductive route 120 (not shown in FIG. 9) depending on the design.

Further, as shown by FIG. 8, the casing 300 may further comprise an ON/OFF switch (330, 340) for each button (310, 320) or for all buttons where the switch (330, 340) is configured to enable or disable the button (310, 320) or all buttons through switching. For example, an insulation mechanism can be attached to the switch (330, 340). When the switch (330, 340) is switched to OFF position, the insulation mechanism is designed to be inserted and positioned in between the metal spring 312 and the first end 121 of the conductive route 120 (not shown in FIG. 8). Thus, when the button (310, 320) is pressed while the switch (330, 340) is at the OFF position, no static electrical signal or electrical signal will be passed to the first end 121 of the conductive route 120. This allows user to disable the button (310, 320) whenever they are not using the button(s). When the switch button (330, 340) is switched to ON position, the insulation mechanism between the metal spring 312 and the first end 121 will be removed and the metal spring 312 is resumed to contact the first end 121 of the conductive route 120, and the static electrical signal or electrical signal will be allowed to pass from the button (310, 320) to the first end 121 of the conductive route 120 again.

In yet another embodiment of the present disclosure, the casing 300 further comprises a battery or is configured to withdraw power from the mobile device 200 or from a third power source to enhance the static electrical signal or electrical signal delivered to the first end of conductive route(s). This may be required if the static electrical signal or electrical signal generated at the button is not strong enough to reach to the second end of the conductive route(s). Further, instead of enhancing the static electrical signal, the casing can also be configured to generate an electrical signal from the battery or the power source and deliver the electrical signal to the first end of the conductive routes whenever the corresponding button is pressed without requiring static electrical signal generated from the user.

In yet another embodiment of the present disclosure, another model of the mobile game control system is disclosed which does not utilize a screen cover or a screen protector. In this model, the disclosed mobile game control system comprises: a casing adapted to fit a mobile device; at least one control button located on the casing; and at least one conductive route, wherein one end of the at least one conductive route is connected to the at least one control button and another end of the at least one conductive route is configured to contact a specified point on the touchscreen of the mobile device when the mobile device is fitted into the casing. Preferably, the specified point is in proximity to the edge of the touchscreen. Each of the at least one control button is designed to correspond to one conductive route and each conductive route is designed to contact one specified point of the touchscreen. When a control button on the casing is pressed, a static electrical signal or electrical signal is delivered to the control button's corresponding conductive route and then to the corresponding specified point of the touchscreen. A simulated touch is then produced through the static electrical signal or electrical signal at the specified point of the touchscreen as if the specified point of the touchscreen is being physically touched. This allows mobile game or application designers to design an input command at each specified point of the touchscreen for their games and applications so that user can easily trigger these input commands by pressing their corresponding buttons on the casing. This model is particularly suitable for touchscreens with curved surfaces and for mobile devices unfit for screen cover or screen protector.

Like the other model, the casing in this model may further comprise a battery or be configured to withdraw power from the mobile device or from a third power source to enhance the static electrical signal or electrical signal delivered to the conductive route(s) from the button(s). The casing can also be configured to generate an electrical signal from the battery or the power source and deliver the electrical signal to the conductive route(s) whenever the corresponding control button(s) is pressed without requiring static electrical signal generated from the user.

Note that while drawings of the present disclosure generally depict a mobile game control system which provide two additional control buttons (e.g., intended for index fingers of both hands) for mobile devices, it should be noted that designs with more than two buttons can easily be implemented according to the present disclosure and should also be considered as part of the present disclosure. For instance, additional conductive route(s) can be implemented to the screen cover from a point specified on the screen cover (a point that corresponds to a point on the touchscreen of the mobile device) to the back of the mobile device, which create additional button(s) to be controlled by the middle or ring finger(s) of the user.

It should also be noted that when the term "a", "an", etc. is used, it is to be interpreted as "at least one" throughout the application, drawings, and claims.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A mobile game control system comprising:
a screen cover configured to be attachable to a touchscreen of a mobile device;
a first conductive route, wherein the first conductive route's first end is embedded within the screen cover and in proximity to a screen cover's edge, and the first conductive route's second end is configured to extend beyond the screen cover's edge;
a second conductive route, wherein the second conductive route's first end is embedded within the screen cover and in proximity to a screen cover's edge, and the second conductive route's second end is configured to extend beyond the screen cover's edge;
a casing adapted to fit the mobile device, wherein the casing comprises a first metallic button and a second metallic button;
wherein when the casing is fitted to the mobile device and the first metallic button is pressed by finger, the first metallic button is configured to contact the first conductive route's second end and transmit a first static electrical signals generated from finger to the first conductive route's first end to produce a first simulated touch on the touchscreen as if the touchscreen is being physically touched; and
wherein when the casing is fitted to the mobile device and the second metallic button is pressed by finger, the second metallic button is configured to contact the second conductive route's second end and transmit a second static electrical signal generated from finger to the second conductive route's first end to produce a second simulated touch on the touchscreen as if the touchscreen is being physically touched.

2. The mobile game control system of claim 1, wherein the screen cover further comprises a screen protector layer which is made of glass, tempered glass, PET film (polyethylene terephthalate) or TPU (thermoplastic polyreuthane).

3. The mobile game control system of claim 2, wherein the screen cover further comprises an adhesive layer where the screen cover is attached to the touchscreen of the mobile device through the adhesive layer.

4. The mobile game control system of claim 1, wherein the first conductive route and the second conductive route are flexible printed circuit (FPC) softboard.

5. The mobile game control system of claim 1, wherein the casing further comprises a first switch that is configured to enable or disable the first button through switching and a second switch that is configured to enable or disable the second button through switching.

6. A mobile game control system comprising:
a screen protector comprising a protecting layer and an adhesive layer, wherein the screen protector is configured to be attachable to a touchscreen of a mobile device through the adhesive layer;
a first conductive route, wherein the first conductive route's first end is embedded within the screen protector and in proximity to a screen protector's edge, and the first conductive route's second end is configured to extend beyond the screen protector's edge;
wherein the first conductive route's first end is configured to be in proximity the first conductive route's second end;
a second conductive route, wherein the second conductive route's first end is embedded within the screen protector and in proximity to a screen protector's edge, and the second conductive route's second end is configured to extend beyond the screen protector's edge;
wherein the second conductive route's first end is configured to be in proximity to the second conductive route's second end;
wherein when screen protector is attached to the mobile device, the first conductive route's second end and the second conductive route's second end are configured to rest on an edge of the mobile device;
wherein the first conductive route and the second conductive route are made of flexible printed circuit softboard;
a casing adapted to fit the mobile device wherein the casing comprises a first metallic button and a second metallic button;
wherein when the casing is fitted to the mobile device and the first metallic button is pressed by finger, the first metallic button is configured to contact the first conductive route's second end and transmit a first static electrical signal generated from finger to the first conductive route's first end to produce a first simulated touch on the touchscreen as if the touchscreen is being physically touched; and
wherein when the casing is fitted to the mobile device and the second metallic button is pressed by finger, the second metallic button is configured to contact the second conductive route's second end and transmit a second static electrical signal generated from finger to the second conductive route's first end to produce a second simulated touch on the touchscreen as if the touchscreen is being physically touched.

7. A mobile game control system comprising:
a screen cover configured to be attachable to a touchscreen of a mobile device;
a first conductive route, wherein the first conductive route's first end is embedded within the screen cover and in proximity to a screen cover's edge, and the first conductive route's second end is configured to extend beyond the screen cover's edge;

wherein the first conductive route's first end is configured to be in proximity to the first conductive route's second end;

a second conductive route, wherein the second conductive route's first end is embedded within the screen cover and in proximity to the screen cover's edge, and the second conductive route's second end is configured to extend beyond the screen cover's edge;

wherein the second conductive route's first end is configured to be in proximity to the second conductive route's second end;

wherein when screen cover is attached to the mobile device, the first conductive route's second end and the second conductive route's second end are configured to rest on an edge of the mobile device;

wherein the first conductive route and the second conductive route are made of flexible printed circuit softboard;

a casing adapted to fit the mobile device, wherein the casing comprises a first metallic button and a second metallic button;

wherein when the casing is fitted to the mobile device and the first metallic button is pressed by finger, the first metallic button is configured to contact the first conductive route's second end and transmit a first static electrical signal generated from finger to the first conductive route's first end to produce a first simulated touch on the touchscreen as if the touchscreen is being physically touched without relying on any electrical power source;

wherein when the casing is fitted to the mobile device and the second metallic button is pressed by finger, the second metallic button is configured to contact the second conductive route's second end and transmit a second static electrical signal generated from finger to the second conductive route's first end to produce a second simulated touch on the touchscreen as if the touchscreen is being physically touched without relying on any electrical power source;

wherein when the casing is fitted to the mobile device and the screen cover is attached to the mobile device, the first metallic button, the second metallic button, the first conductive route and the second conductive route are arranged to locate behind the screen cover or at the same level as screen cover when the touchscreen is facing upward.

\* \* \* \* \*